United States Patent
Yi et al.

(10) Patent No.: US 8,852,329 B2
(45) Date of Patent: Oct. 7, 2014

(54) DRY CARBON DIOXIDE CAPTURING DEVICE WITH MULTISTAGE SUPPLY STRUCTURE

(71) Applicant: Korea Institute of Energy Research, Daejeon (KR)

(72) Inventors: Chang-Keun Yi, Daejeon (KR); Young Cheol Park, Daejeon (KR); Sung-Ho Jo, Daejeon (KR); Gyoung Tae Jin, Daejeon (KR); Dowon Shun, Daejeon (KR); Dal-Hee Bae, Daejeon (KR); Jaehyeon Park, Daejeon (KR); Ho-Jung Ryu, Daejeon (KR); Seung-Yong Lee, Daejeon (KR); Jong-Ho Moon, Seoul (KR); Dong-Ho Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 13/682,588

(22) Filed: Nov. 20, 2012

(65) Prior Publication Data

US 2013/0152794 A1 Jun. 20, 2013

(30) Foreign Application Priority Data

Nov. 24, 2011 (KR) .................. 10-2011-0123717

(51) Int. Cl.
| | | |
|---|---|---|
| *B01D 53/02* | (2006.01) | |
| *B01D 53/12* | (2006.01) | |
| *B01D 53/62* | (2006.01) | |
| *B01D 53/83* | (2006.01) | |

(52) U.S. Cl.
CPC ............... *B01D 53/12* (2013.01); *Y02C 10/04* (2013.01); *B01D 53/62* (2013.01); *B01D 2259/128* (2013.01); *Y02C 10/08* (2013.01); *Y02C 10/06* (2013.01); *B01D 2251/306* (2013.01); *B01D 53/83* (2013.01); *B01D 2259/4009* (2013.01); *B01D 2257/504* (2013.01); *B01D 2251/304* (2013.01)
USPC .................. 96/134; 96/122; 96/123; 96/150; 95/139; 422/144; 423/230

(58) Field of Classification Search
CPC ........ B01D 53/12; B01D 53/62; B01D 53/83; B01D 2251/304; B01D 2251/306; B01D 2257/504; B01D 2259/128; B01D 2259/4009; Y02C 10/04; Y02C 10/06; Y02C 10/08
USPC .................. 96/122, 123, 134, 150; 423/230; 422/144; 95/139
See application file for complete search history.

(56) References Cited

U.S. PATENT DOCUMENTS

| | | | | |
|---|---|---|---|---|
| 4,224,041 A | * | 9/1980 | Noack et al. | ..................... 96/146 |
| 4,409,102 A | * | 10/1983 | Tanner | ......................... 210/603 |

(Continued)

*Primary Examiner* — Christopher P Jones
(74) *Attorney, Agent, or Firm* — Baker & Hostetler LLP

(57) ABSTRACT

Disclosed is a dry carbon dioxide capturing device which can improve sorption efficiency by supplying sorbent for absorbing carbon dioxide or exhaust gas containing carbon dioxide to a recovery reactor in multistages at various heights. The dry carbon dioxide ($CO_2$) capturing device with multistage supply structure comprises a recovery reactor 102 to recover $CO_2$ by contacting a solid sorbent with exhaust gas; a recovery cyclone 110 connected to the recovery reactor 102 to discharge a gas while separating the $CO_2$-captured solid sorbent only; a regenerator 114 connected to the recovery cyclone 110 to receive the $CO_2$-captured solid sorbent and separate $CO_2$ captured in the solid sorbent; and a pre-treatment reactor 122 connected to the regenerator 114 for cooling the solid sorbent free from $CO_2$, wherein at least one of the exhaust gas supply line and the sorbent supply line has two or more arranged according to the height of the recovery reactor 102.

3 Claims, 3 Drawing Sheets

(56) References Cited

U.S. PATENT DOCUMENTS

| | | | |
|---|---|---|---|
| 4,539,188 A * | 9/1985 | Hirsch et al. | 423/210 |
| 5,304,234 A * | 4/1994 | Takatsuka et al. | 95/106 |
| 6,030,591 A * | 2/2000 | Tom et al. | 423/240 S |
| 6,387,337 B1 * | 5/2002 | Pennline et al. | 423/220 |
| 2002/0023538 A1 * | 2/2002 | Agarwal et al. | 95/108 |
| 2010/0172810 A1 * | 7/2010 | Yi et al. | 422/292 |

* cited by examiner

DRY CARBON DIOXIDE CAPTURING DEVICE WITH MULTISTAGE SUPPLY STRUCTURE

RELATED APPLICATIONS

This application claims priority to Korean Patent Application No. 10-2011-0123717, filed on Nov. 24, 2011 in the Korean Intellectual Property Office, the entire disclosure of which is incorporated herein by reference.

BACKGROUND OF THE INVENTION

1. Field of the Invention

The present invention relates to a dry carbon dioxide capturing device, and more specifically to a dry carbon dioxide capturing device which can improve sorption efficiency by supplying sorbent for absorbing carbon dioxide or exhaust gas containing carbon dioxide to a recovery reactor in multistages at various heights.

2. Description of the Related Art

A carbon dioxide capture apparatus in related art generally employs a wet process to recover $CO_2$. That is, the wet process is carried out by passing $CO_2$-containing gas through an amine solution, to allow $CO_2$ to be absorbed into the solution and regenerating the solution in a regeneration column, thus reusing the solution. However, the wet process has a demerit of further creating waste water during operation of the wet process.

In order to overcome disadvantages of the wet process in the art, a dry process for $CO_2$ recovery has been proposed. This method is to recover $CO_2$ by a dry processing system using two reactors, wherein $CO_2$ fed into a recovery reactor is adsorbed to a solid adsorbent (a dry adsorbent) and removed. The solid adsorbent inflows into a regeneration reactor ('regenerator') to remove the adsorbed $CO_2$, $H_2O$ is adsorbed to the solid adsorbent in a pre-treatment reactor, and then the adsorbent is recycled in a recovery reactor.

However, as shown in FIG. 2, the recovery reactor has a problem that the quantity of sorbent existing in the reactor is continuously decreasing from the lower end portion into which sorbent is put in (see Daizo Kunii & Octave Levenspiel, Fluidization Engineering, Butterworth-Heinemann, 2nd Edition, 1991, page 195).

Especially in the case of using a fluidized bed reactor as the recovery reactor, the partial pressure of exhaust gas is lowered toward the upper side of the recovery reactor (see FIG. 3), so the sorption ability of sorbent is lowered for exhaust gas (see Esmail R. Monazam & Lawrence J. Shadle and Ranjani Siriwardane, Equilibrium and Absorption Kinetics of Carbon Dioxide by Solid Supported Amine Sorbent, Wiley Online Library, 2010).

Accordingly, the conventional method has a problem that the sorption rate of $CO_2$ by the recovery reactor cannot increase any more.

SUMMARY OF THE INVENTION

Accordingly, it is an object of the present invention to provide a dry carbon dioxide capturing device which can improve sorption efficiency by supplying sorbent for absorbing carbon dioxide or exhaust gas containing carbon dioxide to a recovery reactor in multistages at various heights.

In order to accomplish the above object, there is provided a dry carbon dioxide ($CO_2$) capturing device with multistage supply structure, comprising: a recovery reactor to recover $CO_2$ by contacting a solid sorbent with exhaust gas, which is fed from outside through an exhaust gas supply line and contains $CO_2$; a recovery cyclone connected to the recovery reactor to discharge a gas while separating the solid sorbent capturing $CO_2$ ('$CO_2$-captured solid sorbent') only; a regenerator connected to the recovery cyclone to receive the $CO_2$-captured solid sorbent and separate $CO_2$ captured in the solid sorbent through a fluidized gas; and a pre-treatment reactor connected to the regenerator through a sorbent supply line to cool the solid sorbent free from $CO_2$ and feedback the cooled solid sorbent to the recovery reactor, wherein the number of the exhaust gas supply line or the sorbent supply line, which is connected to the recovery reactor, is two or more according to the height of the recovery reactor.

Preferably, the exhaust gas feed rate of an upper side exhaust gas supply line is lower than that of a lower side exhaust gas supply line.

Preferably, the sorbent feed rate of an upper side sorbent supply line is lower than that of a lower side sorbent supply line. According to the present invention, the sorption efficiency of $CO_2$ can be increased by installing more exhaust supply lines and sorbent supply lines in the existing device. It is also possible to maintain an improved $CO_2$ processing ability even by reducing the whole scale of the device contrariwise.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a preferred embodiment of the present invention will be described in more detail with reference to the accompanying drawings.

Figure 1:
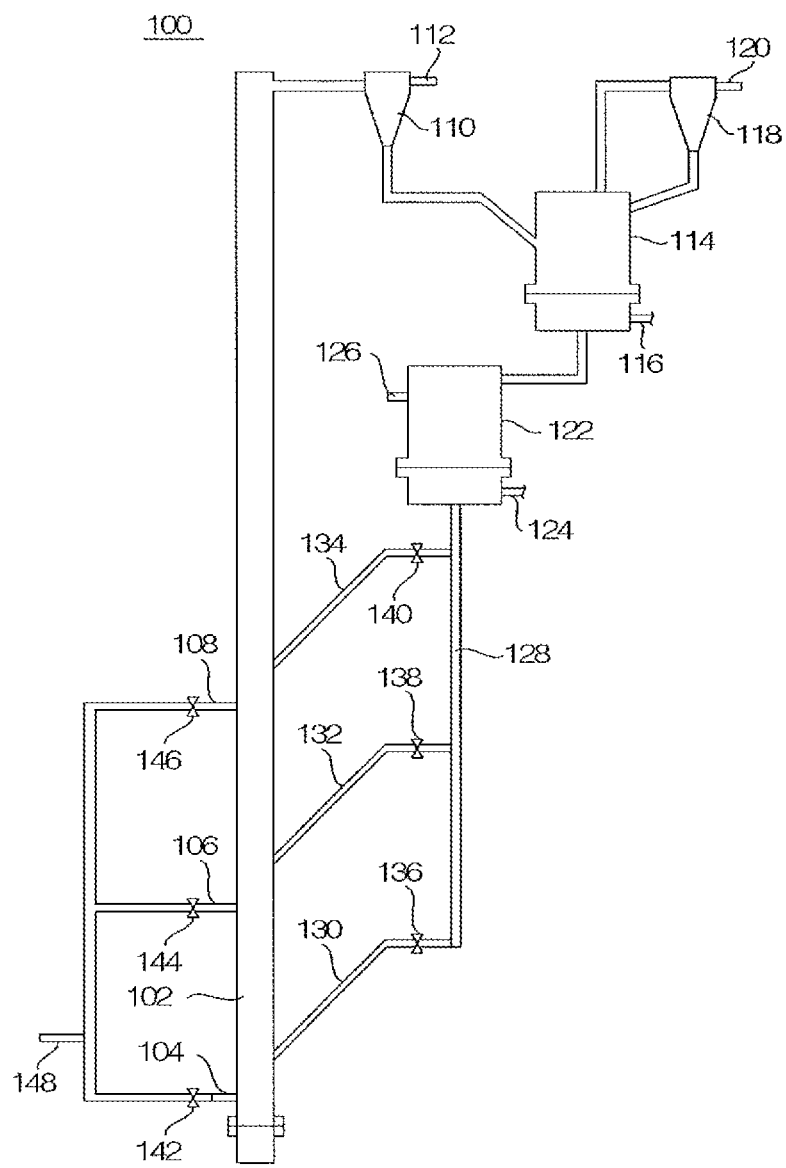
FIG. 1 is a schematic view illustrating a dry $CO_2$ capture apparatus with multistage supply structure according to one embodiment of the present invention.
Figure 2:
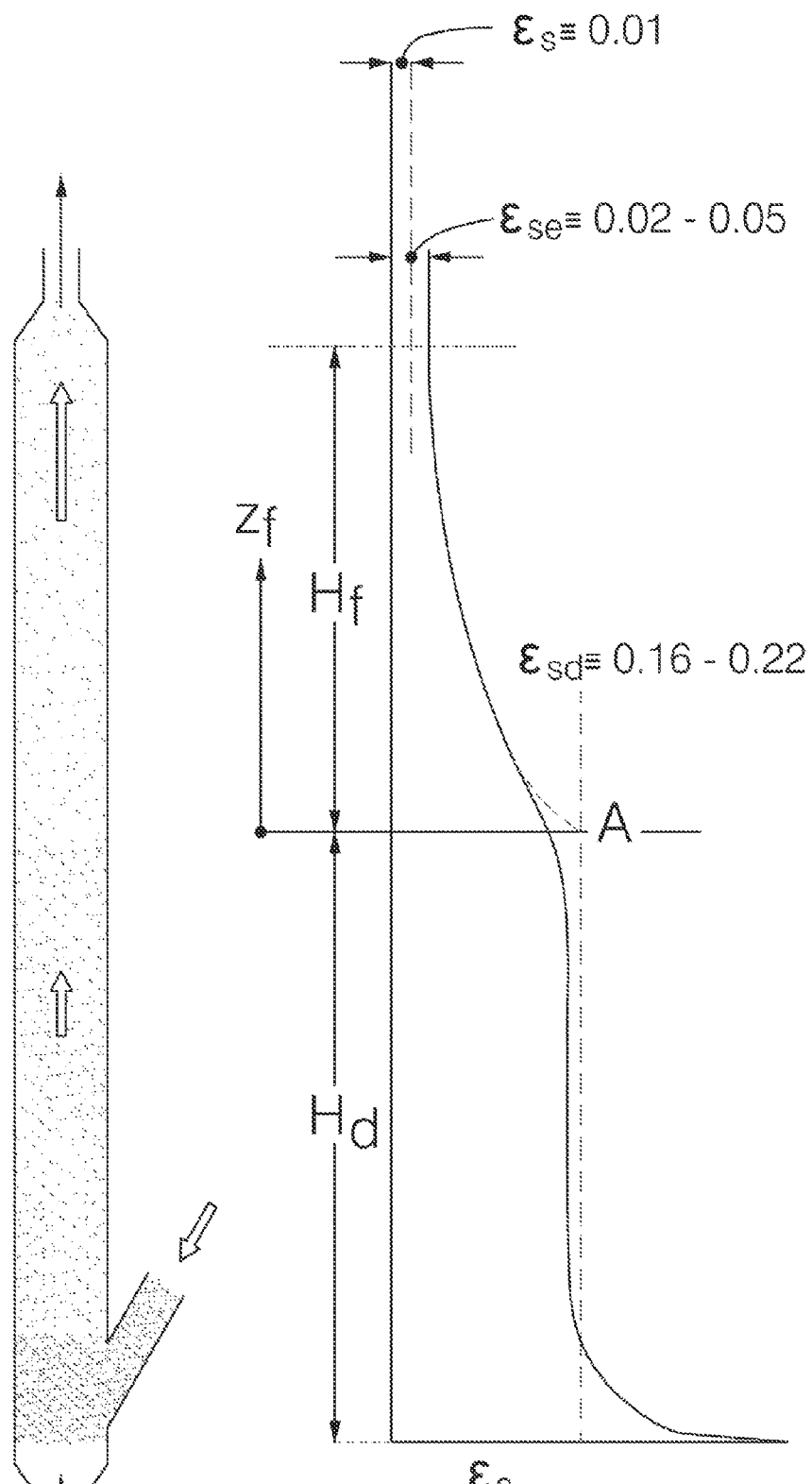
FIG. 2 is a graph showing the sorption rate of sorbent according to the height in the recovery reactor.
Figure 3:
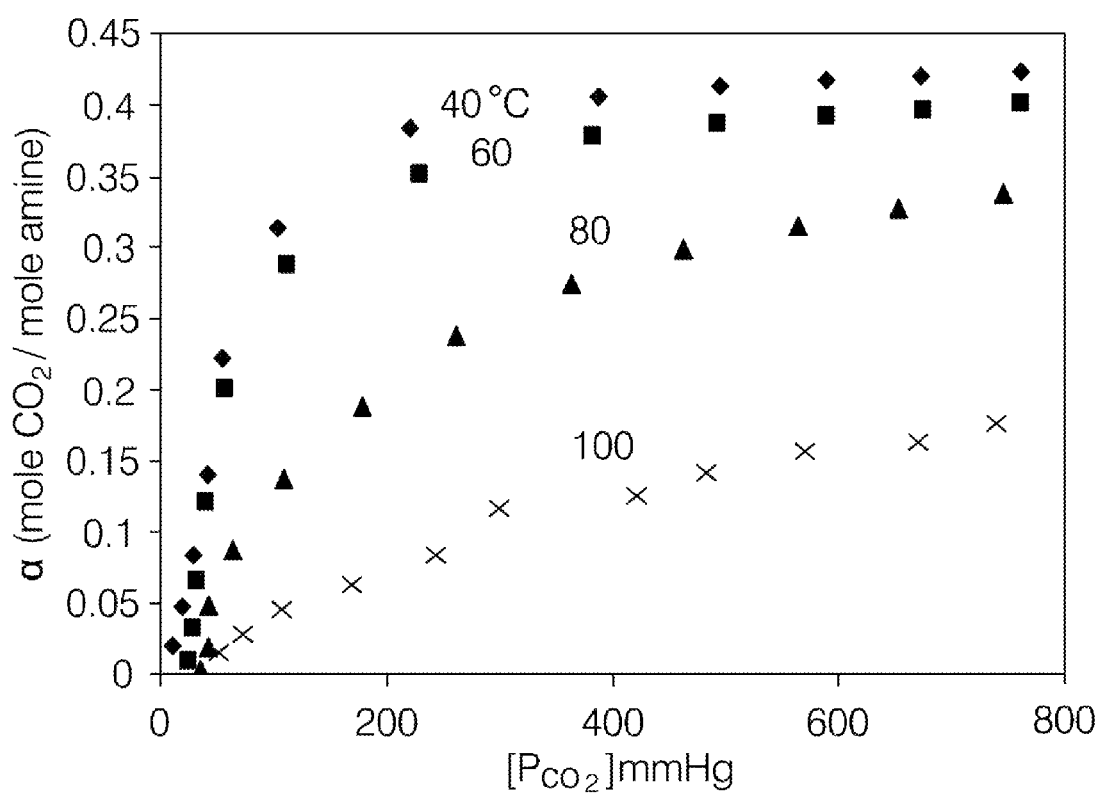
FIG. 3 is a graph showing the sorption ability of sorbents according to the sorption temperature.

Referring to FIG. 1, reference numeral 100 denotes a dry $CO_2$ capturing device with multi supply structure according to the preferred embodiment of the present invention.

The dry $CO_2$ capturing device 100 generally includes a recovery reactor 102, a recovery cyclone 110, a regenerator 114 and a pre-treatment reactor 122, which are commonly known in the art.

The recovery reactor 102 may be a fixed bed reactor, a fluidized bed reactor or a recovery reactor typically used in other commonly known dry $CO_2$ capturing devices. Specifically, in the case of using the fluidized bed reactor, a dry solid sorbent is fluidized by exhaust gas, therefore, the exhaust gas in a gas state may actively contact a solid adsorbent in a solid state to improve $CO_2$ removal efficacy, thereby being preferable.

The dry solid sorbent used in the present invention may include any one generally used in the art, and in particular, $K_2CO_2$ or $Na_2CO_3$ having favorable $CO_2$ adsorption is preferably used.

According to a major characteristic, at least one of the exhaust gas supply line for supplying the exhaust gas to the recovery reactor 102 and the sorbent supply line for supplying the sorbent from the pre-treatment reactor 122 to the recovery reactor 102 has two or more arranged according to the height of the recovery reactor 102.

Thus, the exhaust gas is fed through a plurality of an exhaust gas supply line 104, 106 and 108 which are divided from a main exhaust gas supply line 148 into the recovery reactor 102, and in the case of using the fluidized bed reactor, fluidization of the solid sorbent must be retained by controlling injection pressure and flow rate of the exhaust gas. The exhaust gas supply line 104, 106 and 108 have control valves 142, 144 and 146 for controlling the supply of exhaust gases, respectively. Also, the exhaust gas should be introduced at an injection temperature wherein the dry solid sorbent actively absorbs $CO_2$. Such an injection temperature may be varied depending upon species of the dry solid sorbent.

The recovery cyclone 110 may be an apparatus commonly known in the art, wherein the solid sorbent containing $CO_2$ absorbed therein ('$CO_2$-absorbed solid sorbent') in the recovery reactor 102 is centrifuged to cause the solid sorbent to fall down by self-weight while light gas, that is, the exhaust gas free from $CO_2$ may flow through an isolated gas discharge line 112 connected to the recovery cyclone 110 to further operations.

The regenerator 114 may heat the $CO_2$-absorbed solid sorbent to allow the solid sorbent to release $CO_2$. Herein, a heating temperature of the solid sorbent may be higher than the injection temperature of the exhaust gas. Heating the solid sorbent in the regenerator 114 may be done in a fluidized state by the regenerated gas inflowing from a regenerated gas supply line 116 wherein the regenerated gas may be steam. When using steam as the regenerated gas, removing moisture only from the regenerated gas may preferably provide pure $CO_2$. Further, a diffusion plate to diffuse steam to hence perform fluidization of the solid sorbent is mounted inside the regenerator 114, and the solid sorbent is placed above the diffusion plate while the regenerated gas supply line 116 may be connected to a bottom of the diffusion plate. The diffusion plate may be provided with a solid sorbent delivery line, which passes through the diffusion plate to transport the solid sorbent to the pre-treatment reactor 122.

The regenerator 114 may further be provided with a regeneration cyclone 118 to prevent loss of the solid sorbent suspended by the regenerated gas. The regeneration cyclone 118 may substantially have the same structure as that of the recovery cyclone 110. The top end portion of the regenerator 114 is connected to a $CO_2$ discharge line 120 to discharge a gas absorbed to the solid sorbent, i.e., $CO_2$ therethrough.

The solid sorbent passed through the regenerator 114 may have a temperature, at which $CO_2$ is easily absorbed in the pre-treatment reactor 122, and then, may move to the recovery reactor 102.

In order to cool the solid sorbent in the pre-treatment reactor 122, a pre-treatment gas may be supplied to the pre-treatment reactor 122. Such a pre-treatment gas may include, for example, air or inert gas such as nitrogen and be supplied through the pre-treatment gas supply line 124. A temperature of the pre-treatment gas should be at least equal to or less than the injection temperature of the exhaust gas fed to the recovery reactor 102. In addition, the pre-treatment gas may rapidly cool the solid sorbent by fluidized bed motion of the solid sorbent in the pre-treatment reactor 122.

In addition, the dry solid sorbent containing $H_2O$ absorbed therein has a characteristic wherein $CO_2$ is easily soluble in $H_2O$, and may hence increase $CO_2$ sorption rate. Accordingly, it is preferable to supply the pre-treatment gas in a saturated water vapor state so as to early moisturize the solid sorbent.

The pre-treatment reactor 122 may be connected to the pre-treatment gas discharge line 126 to discharge the pre-treatment gas fed to the pre-treatment reactor 122. In order to prevent the solid sorbent, which passes through the pre-treatment gas discharge line 126, from releasing therefrom, a pre-treatment cyclone (not shown) with the same construction as that of the regeneration cyclone 118 may be mounted on the pre-treatment gas discharge line 126. Accordingly, the solid sorbent recovered by the pre-treatment cyclone is fed back again to the pre-treatment reactor 122, while the pre-treatment gas with absorbed thermal energy only may be exhausted from the solid sorbent.

The solid sorbent discharged from the pre-treatment reactor 122 by contacting the pre-treatment gas with the solid sorbent has a temperature substantially identical to the injection temperature of the recovery reactor 102.

The sorbent that was pretreated through the pre-treatment reactor 122 is moved through a main sorbent supply line 128, and is supplied to the recovery reactor 102 in multistages at various heights thereof through a plurality of sorbent supply lines 130, 132 and 134 as shown in FIG. 1. The sorbent supply lines 130, 132 and 134 have control valves 136, 138 and 140 for controlling the supply of sorbents, respectively.

The number of exhaust gas supply lines 104, 106 and 108 and/or the number of sorbent supply lines 130, 132 and 134 may be arranged with either of the two in plurality and the other in singularity, or both in plurality.

In particular, the number and height of exhaust gas supply lines 104, 106 and 108 and/or the number and height of sorbent supply lines 130, 132 and 134 may be determined through repeated experiments in the system design so as to optimize the sorption rate of $CO_2$.

Namely, by properly combining the condition of raising the partial pressure of $CO_2$ by supplying exhaust gas continuously at various heights through the exhaust gas supply lines 104, 106 and 108 and the condition of supplying sorbent anew through sorbent supply lines 130, 132 and 134, it is possible to make sorption of $CO_2$ by sorbent occur vigorously. At this time, the ascending air current of the recovery reactor 102 is made by exhaust gas. Therefore, by installing the exhaust gas supply lines 104, 106 and 108 lower than the corresponding sorbent supply lines 130, 132 and 134, it is possible to increase the contact probability of ascending $CO_2$ and sorbent.

And in the lower end portion of the recovery reactor 102, there could be a quantity of $CO_2$ that ascends without being absorbed entirely by sorbent. Therefore, it is preferable to configure the exhaust gas supply lines 104, 106 and 108 in such a way that the feed rate of exhaust gas decreases toward the upper side. Likewise with sorbent, not all the sorbent particles absorb $CO_2$ at the maximum sorption rate in the lower end portion of the recovery reactor 102. Therefore, it is preferable to configure the sorbent supply lines 130, 132 and 134 in such a way that the feed rate of sorbent decreases toward the upper side.

Also, with the improvement of $CO_2$ sorption ability by the above-mentioned multistage exhaust gas injection or sorbent supplying, it is possible to provide uniform heat dispersion throughout the recovery reactor 102 by branch-injecting of regenerated solid particles in the middle portion instead of injecting of the whole from the bottom of the sorption reactor. It is not possible for the recovery reactor 102 to obtain the maximum sorption ability of $CO_2$ unless the injection temperature is maintained constant. Therefore, through such heat dispersion, it is possible to obtain an additional advantage that heat control of the recovery reactor 102 becomes easy.

Although preferred embodiments of the present invention have been described for illustrative purposes, those skilled in the art will appreciate that various alterations and modification are possible, without departing from the scope and spirit of the present invention as disclosed in the appended claims.

What is claimed is:

1. A dry carbon dioxide ($CO_2$) capturing device with multistage supply structure, comprising:
    a recovery reactor to recover $CO_2$ by contacting a solid sorbent with exhaust gas, which is fed from outside through an exhaust gas supply line and contains $CO_2$;
    a recovery cyclone connected to the recovery reactor to discharge a gas while separating the solid sorbent capturing $CO_2$ ('$CO_2$-captured solid sorbent') only;
    a regenerator connected to the recovery cyclone to receive the $CO_2$-captured solid sorbent and separate $CO_2$ captured in the solid sorbent through a fluidized gas; and
    a pre-treatment reactor connected to the regenerator through a sorbent supply line to cool the solid sorbent free from $CO_2$ and feedback the cooled solid sorbent to the recovery reactor,
    wherein at least two exhaust gas supply lines are connected to the recovery reactor at different heights of the recovery reactor, and at least two sorbent supply lines are connected to the recovery reactor at different heights of the recovery reactor.

2. The device according to claim 1, wherein an upper side exhaust gas supply line is configured to have a lower exhaust gas feed rate lower than that of a lower side exhaust gas supply line.

3. The device according to claim 1, wherein an upper side sorbent supply line is configured to have a sorbent feed rate lower than that of a lower side sorbent supply line.

* * * * *